INVENTORS
ANTHONY J. HORNFECK
AND HAROLD H. KOPPEL
BY John F. Luhrs
ATTORNEY

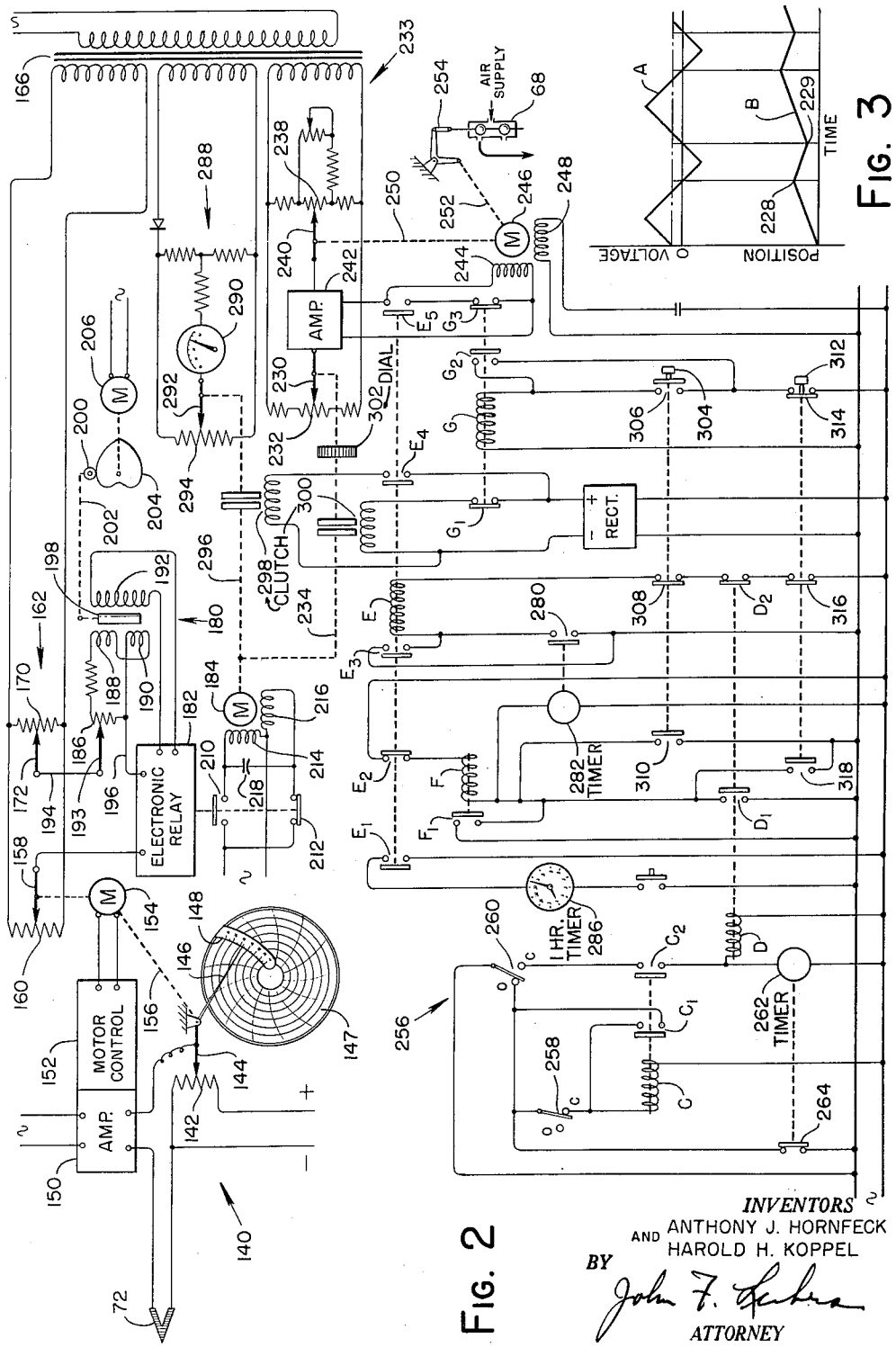

United States Patent Office 3,028,095
Patented Apr. 3, 1962

3,028,095
TEMPERATURE CONTROL OF A PROCESS HAVING HIGH HEAT STORAGE CAPACITY
Anthony J. Hornfeck and Harold H. Koppel, South Euclid, Ohio, assignors to Bailey Meter Company, a corporation of Delaware
Filed Apr. 29, 1958, Ser. No. 731,666
20 Claims. (Cl. 236—15)

This invention relates to apparatus for controlling a condition and more particularly to apparatus and a method for controlling the temperature of a process having high heat energy storage capacity.

While not limited to, the invention finds particular utility in connection with the control of a glass melting tank which as is well known in the art has a very high heat energy storage capacity. In processes of this nature conventional methods of temperature control have been found unsatisfactory. In the past the method of controlling such a process has been to position a fuel control valve manually in accordance with a temperature indicator to adjust the flow of fuel to the glass tank, or to continuously derive a control signal automatically from the deviation of temperature from the desired value and adjust the fuel flow accordingly.

In either of the above methods of control is has been found extremely difficult to maintain a constant temperature within the glass tank since due to the high heat storage capacity there is considerable over-shoot whenever a corrective adjustment of fuel supply is made. In the manual type of control, continuous supervision by the operating personnel is required to maintain the temperature within desired limits, and when automatic control is employed the controlling apparatus operates incessantly with continuous over-shoot beyond the desired temperature limits.

We have found that the temperature of a process having a high heat storage capacity can be automatically maintained within desired temperature limits by periodically applying a corrective action to the temperature of a magnitude proportional to the algebraic sum or integral of the temperature deviations over a period of time. Thus, it is a principal object of this invention to continuously measure and integrate the temperature deviations of a process from a set point temperature and periodically apply a corrective action to the temperature of magnitude proportional to the integral of the temperature deviations over a period of time.

The customary glass melting tank is a regenerative type of furnace fired alternately from opposite sides to effect preheating of the incoming air by the refractory. Regenerators are provided on opposite sides of the furnace through which the incoming air and flue gas alternately flow due to the transfer of firing between opposite sides of the furnace. Thus, heat absorbed in one regenerator when flue gas is flowing therethrough will be utilized to heat the incoming air when the firing is transferred to the other side of the furnace.

Since the fuel must be shut off to the glass tank during reversal of the firing from one side to the other, a convenient time for applying a corrective change to the fuel supply is during the reversal. Thus, it is a further object of the invention to continuously integrate the temperature deviations during operation of a glass melting tank and then apply a corrective action to the fuel supply during a furnace reversal in accordance with the integral of the temperature deviations over a preceding period of operation.

Another object of the invention is to substantially eliminate the tendency of over-shoot in automatic temperature control of a process having high heat storage capacity.

In the preferred embodiment of the invention the temperature of a glass melting tank is continuously measured and recorded. An integrating mechanism including a reversible electric motor is provided for continually positioning the contact arm of a slidewire resistance in accordance with the integral of the temperature deviation within the furnace from a desired value. The slidewire resistance is connected in a bridge circuit, the output of which is impressed on an electric motor operative in response to unbalance of the bridge to position a second contact arm relative to another slidewire resistance of the bridge circuit to effect balance of the bridge circuit. The motor simultaneously positions a pilot valve to establish a pneumatic signal which operates a control valve to apply a corrective action to the fuel supply to the glass tank.

Circuitry is provided for plugging or preventing rotation of the motor except during alternate furnace reversals whereby a corrective action will be made at that time proportional to the integral of the deviations over an entire furnace cycle. Provision is also made for manual operation of the control apparatus.

The integrated temperature signal is also utilized in conjunction with signals representative of furnace pressure and oxygen content of the flue gas to control the positions of the furnace inlet damper and stack damper. An automatic reversing mechanism is provided for effecting periodic transfer of the firing between opposite sides of the furnace.

The objects and advantages will become apparent from the following description taken in connection with the accompanying drawings wherein:

FIG. 2 is a schematic illustration of a portion of the control apparatus illustrated in FIG. 1, and FIG. 3 is a graphical illustration of the integrating action of the invention.

Figure 1:
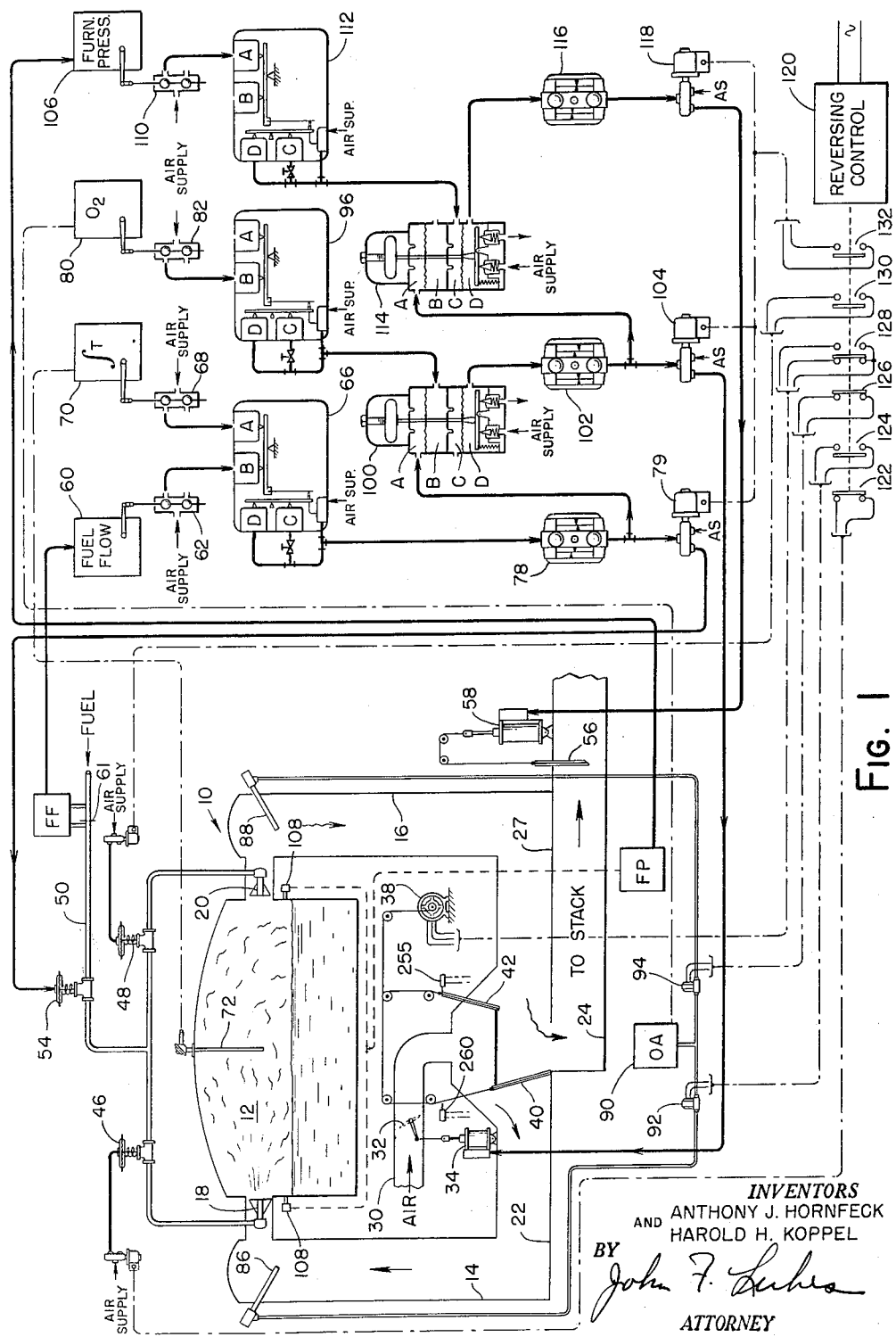
FIG. 1 is a schematic illustration of a glass melting tank or furnace and control system therefore.

Referring to FIG. 1 of the drawings, there is shown a glass melting tank or furnace indicated generally by the reference numeral 10. The construction of the glass tank is well known to those skilled in the art comprising an upper dome shaped chamber 12 for molten glass communicating with a pair of regenerative chambers 14, 16 which are alternately employed as an inlet and outlet for conducting air to and flue gases from the chamber 12.

A pair of fuel nozzles 18, 20 extend through the wall of the furnace 10 for supplying fuel which is mixed with air supplied from the chambers 14, 16 respectively and burnt within the chamber 12.

The furnace 10 is of the regenerative type in which the flow of flue gases and incoming air are alternately reversed so that the air and the flue gases alternately flow through the two chambers 14, 16. This is accomplished by alternately firing the furnace 10 from the opposite sides thereof through control of the fuel supply to nozzles 18, 20 and by a reversing damper for selectively connecting the chambers 14, 16 to the stack (not shown) and air supply respectively.

The purpose of reversing the flow of flue gases and incoming air to the furnace 10 is to obtain greater economy in operation as well as to prevent continuous excessive over-heating of one side of the furnace. When the incoming air is supplied through chamber 14 the flue gases leave by chamber 16 as indicated by the arrows in FIG. 1, and the wall of regenerative chamber 16 will retain the heat of the hot flue gases leaving the furnace to give it up to the cold incoming air when the gas flow is reversed. Thus, by periodically reversing the firing and flow of gas through the furnace, heating of the incoming air is obtained and the overall efficiency of the furnace is substantially increased.

The lower ends of the regenerative chambers 14, 16 are illustrated schematically as interconnected by a conduit 22 which is connected to a conduit 24 leading to the furnace stack (not shown). Air is supplied to the conduit 22 by a conduit 30, the flow being controlled by an inlet air damper 32 which is movable to regulate the supply of air in response to actuation by a damper control drive 34. A reversible electric motor 38 actuates a pair of reversing dampers 40, 42. In the position shown the damper 42 prevents the flow of air to the regenerator 16 but permits flow of flue gases from the regenerator 16 to the stack. Damper 40 in turn prevents flow from the regenerator 14 to the stack but permits the flow of air to the regenerator 14. Accordingly, a flow of gas is established through the system as indicated by the arrows, this flow being reversed by actuation of the dampers 40, 42.

Fuel is supplied to nozzle 18 when the gases flow through the furnace in the direction of the arrows to thereby fire the furnace from the left side as viewed in FIG. 1. Upon reversal, however, fuel will be supplied to the nozzle 20 to transfer the firing to the opposite side of the furnace. Solenoid operated valves 46, 48, control the supply of fuel to the nozzles 18, 20, respectively from a mail fuel supply pipe 50. Each of the valves 46, 48 upon energization of its solenoid will supply fuel to its associated nozzle but prevent the supply of fuel to its nozzle when the solenoid is deenergized. The rate of fuel flow to each valve 46, 48 is controlled by a pneumatically operated control valve 54 connected in the main fuel pipe 50. A stack damper 56 is operated by a pneumatic control drive 58 to maintain the pressure within the chamber 12 at a predetermined value.

A pneumatic control system is illustrated in FIG. 1 for controlling operation of the control valve 54, inlet damper 32 and stack damper 56 to maintain the proper oxygen, temperature and pressure conditions within the furnace 10. A transmitting and recording apparatus 60 is responsive to the pressure differential established by a primary element 61 positioned in the fuel pipe 50 to position a pilot valve 62 and establish a pneumatic output signal representative of the magnitude of the fuel flow in the conduit 50. Such transmitting and recording apparatus may take various forms one of which is disclosed in Gorri et al. Patent 2,737,963. The pilot valve 62 may take the form of that disclosed in Johnson Patent 2,054,464.

The pneumatic output signal established by the pilot valve 62 is applied to the B chamber of a computer relay 66 which is of the type disclosed in Panich Patent 2,805,678. The A chamber of the relay 66 is connected to the output of a pilot valve 68 which is positioned during alternate furnace reversals by a novel integrated temperature transmitting and recording apparatus 70. The apparatus 70 is responsive to temperature deviations within the chamber 12 sensed by a thermocouple 72 and positions the pilot valve 68 at the end of alternate furnace reversals to apply a signal to the A chamber of relay 66 representative of the integral of said temperature deviations over a cycle of operation of the furnace.

The computer relay 66 establishes an output signal in its D chamber corresponding to the difference between the signals applied to the A and B chambers. The C chamber of the relay 66 is connected to the D chamber by a restricted passage to introduce reset action into the system to thereby establish an output signal having proportional plus reset characteristics.

The output signal of the relay 66 is taken through a selector station 78 which may be the type disclosed in Dickey et al. Patent 2,729,222 having means for varying the set point of the system and for transferring control from automatic to manual. When the selector station 78 is set for automatic control, the output signal from the relay 66 will be applied directly to the control valve 54 to thereby position the same in accordance with the difference between the signals applied to the A and B chambers of relay 66. A solenoid operated blocking valve 79 is connected between the selector station 76 and a control valve 54 and is operative when energized to connect the control valve 54 directly to the source of pneumatic pressure for the control system to thereby apply a maximum pressure signal to the control valve and lock the same in a closed position. The solenoid 79 is adapted to be energized during a furnace reversal to shut off the fuel to the furnace while the firing is being transferred from one side of the furnace to the other.

A recording and transmitting apparatus 80 is responsive to the oxygen content of the flue gas leaving the furnace 12 to position a pilot valve 82 to thereby establish a pneumatic signal proportional to the oxygen content of the flue gas. The apparatus 80 may be of any suitable type such as that disclosed in McEvoy Patent 2,652,315 while the pilot valve 82 may be of the type disclosed in the aforesaid Johnson patent. Gas sampling devices 86, 88 are positioned on opposite sides of the furnace 12 so that samples of flue gas may be obtained when the furnace is fired from either side. Both sampling devices 86, 88 are connected to a gas analyzer 90 associated with the apparatus 80. Solenoid valves 92, 94 are operative when energized to connect the devices 86, 88 to the analyzer 90. When the flow of gas through the furnace 10 is in the direction indicated by the arrows, the solenoid valve 94 is energized and solenoid valve 92 is deenergized since flue gas flows out through the regenerator 16. When the firing of the furnace 10 is reversed, however, the flue gas will flow out through regenerator 14 and in this case the solenoid valve 92 will be energized and solenoid valve 94 deenergized.

The signal established by the pilot valve 82 is transmitted to the B chamber of a relay 96 which is of the form disclosed in the above mentioned Panich patent. The C and D chambers of the relay 96 are interconnected by a restricted passage to establish an output signal in the D chamber having proportional plus reset characteristics. The D chamber of the relay 96 is connected to the B chamber of a relay 100 which is of the type disclosed in Gorrie Re. 21,804. The output from the D chamber of this relay is connected through a selector station 102 and a blocking valve 104 to the control drive 34 for the inlet air damper 32. The selector station 102 is similar to the station 78 having provision for both automatic and manual control and set point adjustment.

The output signal of the relay 66 is supplied to the A chamber of the relay 100 to thereby cause the relay 100 to establish an output signal in its D chamber corresponding to the difference between the output of relay 66 and relay 96. With this arrangement, the output signal of relay 100 is biased by the output signal of relay 96 representative of the oxygen content of the flue gas and applied to the control drive 34 to position the inlet damper 32 accordingly.

An indicating and recording apparatus 106 is responsive to the pressure in chamber 12 of the furnace 10 as sensed by pressure sensing elements 108. The apparatus 106 may be of the type disclosed in Gorrie et al. Patent 2,737,963 and utilized to position a pilot valve 110 of the type disclosed in the above mentioned Johnson patent to establish a signal proportional to the furnace pressure. This pneumatic signal is received by the A chamber of a relay 112 which is of the type disclosed in the Panich patent, the relay 112 having its C and D chambers interconnected by a restricted passage to establish an output signal having proportional plus reset characteristics.

The output of the relay 112 is connected to the C chamber of a relay 114 of the type disclosed in the above mentioned Gorrie reissue patent. The output signal of relay 100 is applied to the A chamber of relay 114 to thereby establish an output signal from relay 114 proportional to the sum of the signals applied to the A and C chambers thereof. The output of relay 114 is connected through a selector station 116 and a blocking valve 118 and applied to the control drive 58 for the stack damper 56.

Referring now to the general operation of the pneumatic control system described above, the integrated temperature signal applied to the A chamber of relay 66 is adjusted only during alternate furnace reversals and therefore is constant during a cycle of operation of the furnace 10. Thus, changes in the output of relay 66 are proportional to changes in the fuel flow sensed by primary element 61, the constant value signal from the transmitting and recording apparatus 72 establishing a set point in the A chamber. The control valve 54, control drive 34 of the inlet air damper and control drive 58 of the stack damper 56 are controlled in parallel by the output of relay 66. Thus, upon a variation in fuel flow in the conduit 50 a corrective signal will be applied to the control valve 54, control drive 34, and control drive 58.

The signals applied to the control drives 34 and 58 are corrected for oxygen content of the flue gas in relay 100, while the signal to the control drive 58 is further corrected for furnace pressure in relay 114. With this arrangement correct temperature and pressure conditions and correct oxygen content of the flue gas are maintained.

As previously mentioned, the firing of the furnace 10 is reversed from one side to the other periodically to effect regenerative heating of the incoming air. To accomplish this an automatic reversing device 120 is provided for periodically actuating the reversing dampers 40, 42, solenoid valves 46, 48, 92, 94, and the blocking valves 78, 104, 118. This device may comprise timing circuits for periodically (preferably every 30 minutes) actuating these parts in a predetermined sequence to accomplish the reversals.

In FIG. 1 the device 120 is illustrated as having a plurality of switches 122, 124, 126, 128, 130, 132, and switches 124, 126 controlling energization of the solenoid valves 92, 94 respectively and the switches 122, 130 controlling energization of the solenoid operated valves 46, 48 respectively. Switch 132 is connected to control energization of a parallel circuit containing solenoid blocking valves 79, 104, 118, and switch 128 is connected to control energization and the direction of rotation of the electric motor 38.

In the positions shown in FIG. 1, the furnace is conditioned for firing from the left side. Switch 122 is closed to energize the solenoid operated valve 46 and supply fuel to the nozzle 18 while solenoid operated valve 48 is deenergized by switch 130 to prevent the flow of fuel to the nozzle 20. Similarly, solenoid valve 94 is energized by switch 126 to obtain samples of flue gas from the regenerative chamber 16 while the solenoid valve 92 is deenergized by switch 124. Switch 132 is open and the controls are unlocked for automatic operation. Switch 128 is in a position to have previously effected rotation of the motor 38 in a direction to actuate the dampers 40, 42 to the positions shown in FIG. 1. It will be apparent that suitable limit switches (not shown) actuated by the dampers 40, 42 may be connected in the motor circuit to deenergize the motor 38 when the dampers 40, 42 have been actuated to either of their controlling positions.

At the end of a predetermined period of operation of the furnace fired from the left side, the timing mechanism of the reversing control 120 will become operative to actuate the switches 122—132 to effect the desired transfer of the firing to the right side of the furnace. The preferred sequence of actuation of these switches is as follows: The switches 122, 126 are actuated to their open positions to shut off the fuel to the left side of the furnace and to terminate the sampling of flue gas in regenerative chamber 16. Simultaneously the switch 132 is actuated to a closed position to lock the controls whereupon valve 54 will assume a closed position and the inlet damper 32 and stack damper 56 will be opened wide to purge the furnace.

The controls will be locked by the reversing control 120 for a period of time sufficient to effect proper purging of the furnace. During the purging operation the switch 128 is actuated to reverse the flow of gases through the furnace to condition the same for firing from the right side and the switches 124, 130 are closed to supply fuel to the right side of the furnace and to condition the gas sampling apparatus for sampling the flue gas in regenerative chamber 14. Subsequently the switch 132 is opened to unlock the controls whereupon the furnace will be conditioned for operation with the firing on the right side thereof.

It will be apparent that the reversing control 120 may comprise suitable timing apparatus arranged to effect periodically the above described sequence of operation of the switches 122—132. The period of time between such reversals is selected to provide sufficient heating of the refractory by the flue gas. In the average glass melting tank it has been found that a 30 minute period between reversals is sufficient.

Referring now to FIG. 2 and to the construction of the temperature indicating and recording apparatus 70, the thermocouple 72 forms part of a D.-C. potentiometer measuring circuit indicated generally by the reference numeral 140. More particularly, the D.-C. voltage produced by the thermocouple is compared with the D.-C. voltage across a portion of an adjustable resistance 142 having a movable contact arm 144 for varying the resistance. The movable contact arm 144 is here indicated schematically as having a recording and indicating arm 146 on the other end thereof which is cooperative with a circular motor driven chart 147 and a scale 148.

The unbalance voltage of the potentiometer circuit 140 is amplified by an amplifier 150 and fed to a motor control circuit 152 which positions a phase sensitive electric motor 154 in a direction corresponding to the direction of unbalance of the potentiometer circuit 140. The contact arm 144 is actuated by the motor 154 through a linkage 156 to vary the magnitude of the resistance 142 in a direction to effect balance of the potentiometer circuit 140. Thus in operation a change in temperature will vary the D.-C. voltage produced by the thermocouple 72 and effect unbalance of the potentiometer circuit 140 whereupon the motor 154 will rotate to position the contact arm 144 to restore balance of the potentiometer circuit 140. Thus, the position of the motor 154 is indicative of the temperature sensed by the thermocouple. The linkage 156 effects movement of the recording arm 146 to provide a continuous record of the temperature of the thermocouple on the chart 147.

The motor 154 in addition to positioning the contact arm 144 simultaneously positions a second contact arm 158 over a slidewire resistance 160 which forms a portion of balanceable bridge network 162 energized by a transformer 166, coupled to a suitable source of alternating voltage. Forming another portion of the balanceable network 162 is a slidewire resistance 170 having a movable contact arm 172 adapted to be manually positioned for establishing a temperature standard or setpoint for the system.

The resistances 160, 170 thus form a bridge circuit of a type well known in the art. To describe briefly the operation of the circuit, contact arm 158 is positioned relative to the slidewire 160 by the motor 154 and thus assumes a position representative of the actual temperature to which the thermocouple is responsive. The contact arm 172 is positioned relative to slidewire 170 manually to a point representing the desired temperature. The network 162 thus establishes an unbalance voltage across the contact arms 158, 172 of phase and magnitude depending on the direction and extent of unbalance and representative of the magnitude and direction of the deviation of the temperature from the set point temperature determined by the position of the contact arm 172.

The magnitude of the voltage produced across the contact arms 158, 172 is proportional to the deviation of the temperature from set point temperature. The direction of unbalance of the circuit 162 depends on whether the deviation is below or above set point, and determines the phase of the output voltage produced across contact arm 158, 172. This signal is continuously modulated by a modulating circuit 180 to produce a signal which is the algebraic sum of the instantaneous deviation and modulation signals. The modulated signal is applied to an electronic relay 182 which is operative to control the direction and extent of rotation of an electric omtor 184.

The modulating circuit 180 may take various forms but is here shown as comprising a variable resistance 186 connected in a circuit with a pair of secondary windings 188, 190 of a movable core transformer which has a primary winding 192 energized by a voltage source provided by a circuit associated with the relay 182. The resistance 186 is provided with an adjustable contact arm 193 coupled to the contact arm 172 by a conductor 194 for impressing the output signal from the network 162 on the modulating circuit 180. Conductor 196 serves to impress the modulated signal from the circuit 180 on the electronic relay 182.

The primary winding 192 is variably coupled to the secondary windings 188, 190 by means of a movable magnetic core member 198 which is reciprocable back and forth to vary the magnetic coupling of the primary winding 192 with the secondary windings 188, 190. For reciprocating the core 194 a roller arm 200 of a linkage 202 is positioned in engagement with the surface of a cam 204 which is driven by a constant speed motor 206 connected to an A.-C. source.

The magnetic core 198 is reciprocable at a slow frequency by the motor 206 and cam 204 to continuously vary the magnetic coupling between the primary 192 and secondaries 188, 190. This frequency is preferably two cycles per minute. The core 198 is symmetrical about the center of the assembly of windings 188, 190, 192 so that an unbalance voltage from the circuit 162 will build up to maximum and decay to zero first in phase and then out of phase with the voltage impressed on primary windings 192. When the control bridge 162 is perfectly balanced the output signal of the modulator circuit will have a voltage envelope of triangular configuration as illustrated by curve A in FIG. 3 but symmetrical about the zero voltage axis. It will be apparent that the magnitude of the output signal may be readily varied by adjustment of the contact arm 193.

The relay 182 is an on and off controller sensitive to the modulated signal applied thereto and controls the direction and extent of rotation of the motor 184 according to the voltage envelope of the signal. A pair of switches 210, 212 are actuated by the relay 182 and are connected in a control circuit for the motor 184 including windings 214, 216, a capacitor 218, and a suitable power source. When the switch 212 is closed and switch 210 is open a circuit is completed from the power source directly through the motor winding 216 and through the capacitor 218 in series with the winding 214, the capacitor 218 being effective to introduce a phase difference between the windings 214, 216. Thus, the motor 184 will rotate in one direction of rotation. If the switch 210 is closed and switch 212 opened, then the winding 214 will be connected directly across the power source while the winding 216 will be connected in series with capacitor 218 to thus reverse the phase relationship of the windings 214, 216 and cause rotation of the motor 184 in the opposite direction.

When the signal applied to the relay 182 is negative the switches will be in the position illustrated in FIG. 2. However, a positive signal will cause the relay 182 to actuate the switches 210, 212 to their closed and open positions respectively.

When the circuit 162 is balanced, the signal applied to the relay 182 will be alternately positive and negative, the time duration and magnitude of the positive and negative signals being equal. When the signal is positive the motor will rotate in one direction a predetermined distance corresponding to the magnitude and duration of the positive signal, and when the signal becomes negative the motor will rotate in the opposite direction an equal distance. Thus the net motor rotation during one cycle of input signal under this condition is zero.

When the circuit 162 is unbalanced the modulating signal superimposed on the output signal from the circuit 162 will produce a voltage envelope similar to that illustrated in FIG. 3 and indicated by the reference letter A. In this case the envelope is not symmetrical about the zero voltage axis but is displaced therefrom in an amount proportional to the output of the circuit 162 and the deviation of the temperature from set point, and the duration and magnitude of the positive signal (or negative signal depending on the direction of the bridge unbalance) is greater than that of the negative signal. Thus, the extent of rotation of the motor 182 in one direction will be greater than in the other direction and for one cycle of the signal applied to the relay 182, there will be a net motor rotation corresponding to the difference in rotation in opposite directions.

In FIG. 3, curve B is a graph of motor position versus time for the voltage envelope illustrated by curve A. During the first half cycle the motor 182 will rotate in one direction to a point 228 and then in the opposite direction during the following negative half cycle to a point 229 which represents the net motor rotation over the cycle. If several cycles of the signal having this voltage envelope are applied to the relay 182 a substantial displacement of the motor shaft will occur.

From the above it will be apparent that the net motor rotation over a period of time corresponds to the integral with respect to time of the temperature deviation from set point temperature. Thus, the motor 184, relay 182 and associated circuitry perform an integrating function for a purpose which will now be described.

As previously mentioned, it is desired to adjust the fuel flow to the furnace during alternate furnace reversals. The circuitry described above is utilized to obtain an integrated temperature signal corresponding to the algebraic sum of the temperature deviation over a cycle of operation of the furnace during which the furnace is fired from both sides. During one cycle of furnace operation the difference in displacement of the motor 184 at the beginning of the cycle and end of the cycle will correspond to the integral of the temperature deviations over the cycle. At the end of the cycle the fuel flow is automatically adjusted according to this integral to thereby establish a rate of fuel supply during the next cycle of operation proportional to the integrated temperature over the preceding cycle. This method of control eliminates the incessant operation inherent in an on-off or other type of controller in such an application.

Referring now to the specific circuitry for accomplishing this result, the motor 184 is utilized to position an adjustable contact arm 230 of a slidewire resistance 232 by means of a linkage 234. The position of the contact arm 230 and resistance of the slidewire 232 thus correspond to the integral of the temperature deviations. The slidewire 232 is connected in a bridge circuit 233 with a second slidewire resistance 238 which has an adjustable contact arm 240. The bridge circuit 233 is energized by a secondary winding of the transformer 166.

The output signal of the bridge 233 is amplified by an amplifier 242 and applied to a winding 244 of a reversible electric motor 246, the other coil 248 of the motor being connected across the source of alternating voltage for the system. The motor 246 is connected by a linkage 250 to the contact arm 240 and by a linkage 252 to a bell crank 254 which actuates the pilot valve 68.

The bridge circuit 233 and motor 246 comprise a null balance system. The contact arm 230 is positioned by the motor 184 in accordance with the integral of the temperature deviations sensed by the thermocouple 172. Thus, the condition of balance of the bridge 233 is varied according to the integral of the temperature deviations to establish a corresponding output signal. This signal would be normally effective to cause rotation of the motor 246 to continually position the contact arm 240 and restore bridge balance. Simultaneously during rotation of the motor 246, the pilot valve 68 would be actuated through linkage 252 and bell crank 254 to establish a pneumatic signal representative of the integral of the temperature deviations.

It will be apparent that if the motor 246 is permitted to operate continuously, there will be a continuous positioning of the pilot valve 68 and continuous correction of the fuel flow, and therefore no integrating action would take place. To introduce the integrating action, the motor 246 is plugged or prevented from rotating except during alternate furnace reversals to thus effect a corrective change in fuel flow only during alternate furnace reversals. If the motor 246 is not permitted to rotate during a complete cycle of furnace operation the contact arm 230 will be continuously positioned according to the integral of the temperature deviations which have occurred with a constant rate of fuel supply set at the beginning of the cycle. At the end of the cycle then the output signal of the bridge circuit 233 will be proportional to the integral of the deviations over the cycle. Thus, if the motor 254 is then permitted to rotate it will rebalance the bridge circuit and actuate the pilot valve 68 to establish a pneumatic signal which is effective to adjust the fuel flow to the furnace in accordance with the integrated temperature over a cycle of furnace operation. After the fuel flow is thus corrected, the motor 254 is again plugged over the following cycle of operation of the furnace.

Plugging of the motor 246 is accomplished by establishing a shunt circuit across the winding 244 which when completed limits the current in the winding to a value below that required to effect rotation of the motor 246. This shunt circuit is completed during each cycle of furnace operation, but broken at the end of each cycle or during alternate furnace reversals to permit the above described rotation of the motor 246.

A suitable control circuit is illustrated in FIG. 2 for effecting unplugging of the motor 246. This circuit is indicated generally by the reference numeral 256 and includes a pair of switches 258, 260 which control energization of a relay coil C arranged to actuate a pair of normally open switches $C_1$, $C_2$. The switches 258, 260 are positioned to be actuated by the dampers 40, 42 and are cooperative with a timer 262 and the relay coil C to effect energization of a main control relay D for a two second interval during alternate furnace reversals. When the furnace is being fired from the left side, the switches 258, 260 will be in their closed and open positions respectively as indicated in FIG. 2. In this condition a circuit is completed by switches 258, 260 energizing relay coil C which closes switches $C_1$, $C_2$. In addition, an energizing circuit for relay coil C is completed through switch $C_1$ and a normally closed switch 264 actuated by the timer 262.

When the firing of the furnace is reversed, the initial movement of the damper 42 will actuate switch 258 to its open position. Relay coil C, however, will remain energized through the circuit established by switch $C_1$ and timer switch 264. When damper 40 reaches its extreme upward position the switch 260 will be actuated to its closed position to complete a circuit through switch $C_2$ and timer 262.

Timer 262 will become operative at the end of a two second interval following energization thereof to open switch 264 and deenergize relay coil C which in turn opens switches $C_1$, $C_2$ to break its holding circuit through switch $C_1$ and the timer circuit established by switch $C_2$.

Relay coil D is connected in parallel circuit with timer 262 and therefore is energized simultaneously with energization of timer 262 and remains energized for the two second period of energization of the timer. This momentary energization of relay coil D is effective to initiate operation of the remainder of the control circuit to effect unplugging of the motor 246.

Due to the particular arrangement of the circuitry associated with the switches 258, 260 and relay coil C, the relay coil D can only be energized during alternate furnace reversals or during transfer of the firing from the left side to the right side of the furnace. For example, if the dampers 40, 42 are returned to the positions illustrated in FIG. 2, switch 260 will be first actuated to its open position by initial movement of damper 40. Subsequently, damper 42 when it reaches its extreme upward position will actuate switch 258 to its closed position. When switch 258 closes, the relay coil C will be energized to establish its holding circuit through switch $C_1$ and switch 264, but since switch 260 is open the timer 262 and relay coil D cannot be energized when switch $C_2$ closes. Therefore, transfer of the firing from the right to the left side of the furnace is ineffective to energize the relay coil D.

The relay coil D actuates a pair of switches $D_1$, $D_2$ which are operative to control unplugging of the motor 246. More particularly, the switch $D_2$ is connected in series with a relay coil E which actuates a plurality of switches $E_1$, $E_2$, $E_3$, $E_4$, and $E_5$. A normally open switch 280 actuated by a timer 282, is connected in series with the relay coil E and switch $D_2$ to also control energization of the coil E.

The relay coil E is energized during operation of the furnace by a holding circuit comprising switch $E_3$ which is connected in a circuit shunting the timer actuated switch 280. However, during the momentary energization of the relay coil D during alternate furnace reversals, switch $D_2$ will be opened to break the holding circuit through switch $E_3$ whereupon switch $E_3$ will open preventing subsequent re-energization of the relay coil E when switch $D_2$ closes at the end of the two second time interval by operation of timer 262.

The switch $E_5$ is connected in a circuit shunting the motor winding 244 to effect unplugging of the motor 246 when the relay coil E is deenergized. When the relay coil E is energized during normal operation of the furnace, the switch $E_5$ is closed, and insufficient current will flow in the winding 244 to effect rotation of the motor 246. However when the shunt circuit is broken by opening of switch $E_5$ rotation of the motor 246 will occur and the pilot valve 68 will be positioned as hereinbefore described to adjust the fuel supply to the furnace according to the integral of the temperature deviations over a cycle of furnace operation.

It has been found that approximately ten seconds is necessary for the motor 246 to balance the bridge circuit 233 upon unplugging thereof. Therefore, provision is made for reenergizing the relay coil E, approximately ten seconds following deenergization thereof. This is accomplished by timer 282 which is energized simultaneously with deenergization of relay coil E by switch $D_1$ which closed upon energization of relay coil D.

Simultaneously with closure of switch $D_1$, switch $E_2$, which was in an open position during energization of relay coil E, closes upon deenergization of the relay coil E to energize a parallel circuit for the timer 282. A relay coil F is connected in series with the switch $E_2$ and timer 282 to be energized upon closure of switch $E_2$. The relay coil F actuates a single switch $F_1$ which closes upon energization of the relay coil F to establish a holding circuit and a parallel circuit for the timer 282 by means of which the timer will remain energized upon opening of switch $D_1$ when relay coil D is deenergized at the end of the two second period.

Timer 282 will thus remain energized after deenergization of relay coil D by the circuit established by switch $F_1$ and will run for 10 seconds at the end of which time it will close switch 280 to energize the relay coil E which in turn will close switch $E_5$ to plug the circuit of the motor 246 for another complete cycle of furnace operation. Simultaneously holding switch $E_3$ of relay coil E is closed, and switch $E_2$ is opened to deenergize the relay coil F which opens switch $F_1$ to deenergize the timer 282.

It will be apparent that the circuitry thus far described will at the end of a cycle of furnace operation unplug the motor 246 to permit the same to position the contact arm 240 and thereby position the pilot valve 68 to establish a pneumatic signal representative of the integral of the temperature deviations over the preceding cycle of furnace operation. To summarize the sequence of operation and function of the various switches and relays, when the firing is transferred to the light side of the furnace the damper 42 upon downward movement thereof will actuate switch 258 to an open position, the relay coil C remaining energized through a holding circuit established by switch $C_1$ and switch 264. Subsequently, the damper 40 when it reaches its extreme upper position will actuate switch 260 the relay coil C still remaining energized through the holding circuit therefor.

Actuation of switch 260 by damper 40 is effective to momentarily energize timer 262 and relay coil D. After a two second time interval has expired, the timer 262 will open switch 264 to deenergize the coil C which in turn will open switch $C_2$ to deenergize timer 262 and relay coil D.

During the two second period or energization of relay coil D, switch $D_2$ is opened and switch $D_1$ is closed. Opening of switch $D_2$ is effective to deenergize relay coil E which in turn opens switch $E_5$ and unplugs the motor 246. Simultaneously with deenergization of relay coil E, switch $D_1$ is effective to energize timer 282 and relay coil F through the circuit of switch $E_2$ which closed upon energization of relay coil E.

When switch $D_1$ is opened by deenergization of relay coil D, relay coil F will remain energized for 10 seconds at the end of which timer 282 will close the switch 280 to energize relay coil E which becomes effective to close switch $E_5$ and plug the motor circuit and to open switch $E_2$ to deenergize relay coil F. Thus, the apparatus is then conditioned for another cycle of furnace operation.

Referring now to other features of the system, the switch $E_1$ is connected in series with a one hour clock 286 which is of the automatic reset type and arranged to be deenergized upon opening of switch E upon deenergization of the relay coil E. The clock 286 will thus reset during alternate furnace reversals when the motor 246 is unplugged and will furnish the operator with an indication during a cycle of furnace operation of the time which has elapsed since the last fuel correction.

Indicating means are also provided for indicating to the operator the integral of the temperature deviations at any instant during a cycle of furnace operation. This means comprises a bridge circuit 288 energized by a secondary winding of the transformer 166. An indicating device 290 responsive to the condition of bridge balance is connected in series with a resistance across the output terminals of the bridge circuit. A contact arm 292 is cooperable with a resistance 294 forming two arms of the bridge. The contact arm 292 is positioned by the motor 184 through a linkage 296 and thus assumes a position proportional to the integral of the temperature deviations in the same manner as contact arm 230 of the bridge circuit 233.

An electro-magnetic clutch 298 of the spring return automatic reset type is provided in the linkage 296 to disengage the same during alternate furnace reversals. The energizing coil of the clutch 298 is connected in series with the switch $E_4$ of the relay coil E across the source so that when the relay coil E is deenergized during alternate furnace reversals, the coil of the clutch will be deenergized by opening of the switch $E_4$. The linkage is disengaged upon deenergization of the clutch and the contact arm 292 will be positioned by the spring return to a zero position wiping out any indication of integrated temperature on the device 290.

A second clutch 300 is connected in the linkage 234 for disengaging the same. In addition a manually operable dial 302 is provided for positioning the contact arm 230 manually when the clutch 300 is disengaged. Provision is made for non-integrating operation of the system to thereby permit the control valve to be adjusted manually by the dial 302. To accomplish this a non-integrating button 304 is provided for actuating a plurality of switches 306, 308, 310, the assembly being biased to the position illustrated in FIG. 2. The switch 306 is connected in series with a relay coil G across the source. The relay coil G actuates a switch $G_1$ connected in series with the clutch 300, a holding switch $G_2$ shunting the switch 306, and a switch $G_3$ connected in series with the switch $E_5$ shunting the motor winding 244.

When the button 304 is depressed by the operator, the switch 306 is actuated to a closed position to energize the relay coil G which in turn opens the switch $G_1$ to deenergize the clutch 300, closes the switch $G_2$ to establish a holding circuit for maintaining energization of the coil G after the button 304 is released, and opens the switch $G_3$ to unplug the motor 246. Thus, actuation of the button 304 is effective to disengage the clutch 300 and unplug the motor 246 whereupon the dial 302 may be manually positioned to actuate the contact arm 230 and establish a set point for the system during manual operation. Since the motor 246 is unplugged it will automatically effect follow-up movement of the contact arm 240 to vary the position of the pilot valve 68.

When the button 304 is depressed the switch 308 is momentarily opened to deenergize the relay coil E and the switch 310 is momentarily closed to energize relay coil F and timer 282. Thus, the apparatus will go through the 10 second timing cycle previously described to reset the clock 286 and clutch 298.

To restore the system to an integrating condition an integrating button 312 is provided for actuating a plurality of switches 314, 316, 318, the assembly being biased to the positions illustrated in FIG. 2. The switch 318 is connected in parallel with the switch 310 and is also effective to control energization of the relay coil F and timer 282, while the switch 316 is connected in series with the relay coil E to control energization of the same. The switch 314 is connected between the source and the holding circuit for relay coil G and thus controls energization thereof.

When the button 312 is depressed, the switch 314 will open to deenergize relay coil G and to break the holding circuit therefor. Switch 316 will open and switch 318 will close to effect the 10 second cycle of operation previously described, at the end of which the motor 246 will be plugged, the clock 286 and clutch 300 reset, and the system conditioned for integrating operation over a cycle of furnace operation.

It is desirable but not necessary to position the contact arm 230 manually following a load or set point change effected by positioning of contact arm 172. If the contact arm 230 is not manually reset in such a case to wipe out any unbalance in the bridge circuit 233 representative of an integrated temperature, the fuel flow permitted by the control valve 54 will not be of the proper value to satisfy the requirements of the new set point or load for the rest of the furnace cycle in which the load or set point change was made. At the end of this cycle a correction will be made but the correction will tend to be excessive since the set point or load change in the previous cycle produced an abnormal integrated temperature deviation. Eventually after a few furnace cycles, the system will again control the fuel flow to produce minimum deviation. It is suggested, however, that contact arm 230 be positioned manually after a load or set point change to eliminate this delay in obtaining a proper fuel flow.

After such a manual correction has been made, the system should not be immediately placed back on integrating operation by depressing button 312 since it takes the furnace a finite period of time to come up to a new temperature after a fuel correction has been made following a set point or load change. This again would cause an integrated deviation which would not produce the proper fuel flow change at the next furnace reversal. Consequently the system should not be placed on integrating operation until the temperature has come up to its new value.

To briefly summarize the operation of the entire control system, control valve 54 is continuously positioned by an output signal from the relay 66 established by the fuel flow and integrated temperature signals. The output signal of relay 66 is continuously corrected in relay 100 by a signal representative of the oxygen content of the flue gas and applied to the control drive 34 to position the inlet damper 32. This signal is further corrected in relay 114 for furnace pressure and utilized to position the stack damper 56. The signal from the integrated temperature indicating and transmitting device 70 is constant over a complete cycle of furnace operation.

The reversing control 120 becomes operative at the end of every 30 minute period of furnace operation to transfer the firing of the furnace to the opposite side thereof by actuation of switches 122—132 in the sequence previously described. When the parts are in the positions illustrated in FIG. 1, the furnace is fired from the left side and gas flow in the direction indicated by the arrows. At the end of the 30 minute period of operation in this condition, the reversing control 120 will become operative to effect transfer of the firing to the right side of the furnace.

During each cycle of operation of the furnace, the potentiometer circuit 140, bridge circuit 162, electronic relay 128, and motor 184, continuously integrate the temperature deviations sensed by the thermocouple 72 to establish a position of contact arm 230 and condition of unbalance of bridge circuit 233 representative of the integral of the deviations. When the firing is transferred from the left to the right side of the furnace, the switches 258, 260 will be actuated to initiate operation of the control circuit which is effective to deenergize the relay coil E to unplug the motor 246. The motor 246 when thus unplugged will position the contact arm 240 to balance the circuit 233 and position the pilot valve 68 to apply a pneumatic signal to the A chamber of the relay 66 proportional to the integral of the temperature deviations over the cycle of furnace operation. This signal is compared with the fuel flow signal applied to the B chamber of the relay 66, and the control valve 55 and dampers 32, 56 are positioned accordingly.

Following the transfer of firing and fuel flow adjustment, the furnace will be fired for another 30 minute period from the right side, at the end of which the reversing control will again become operative to transfer the firing back to the left side of the furnace. In this case, however, the control circuit does not become operative to adjust the fuel supply to the furnace as a result of the particular circuit arrangement of the switches 258, 260 and relay coils C, D hereinbefore described. Accordingly, the pneumatic signal established by the pilot valve 68 remains constant over a complete cycle of furnace operation and the fuel flow is only adjusted by the integrated temperature signal during alternate furnace reversals or during transfer of the firing from the left to the right side of the furnace.

It is to be noted that the control circuit may be placed in a non-integrating condition at any time by depressing the button 304 whereupon the rate of fuel supply may be controlled manually by adjustment of the dial 302. To return the circuit to an integrating condition the button 312 is depressed, and manual control will be terminated.

The method of temperature control employed obviously eliminates the incessant correcting of fuel supply and over-shoot encountered with prior methods of control. Instead of continuously correcting the fuel supply with temperature deviations, the temperature deviations are summed up or integrated over a period of time whereupon a correction to fuel supply is made in proportion to the integral of the deviations. Thus, the correction is periodically made according to the accumulated deviations rather than continuously according to the instantaneous deviations, and over-shoot of the temperature is substantially prevented since the small cyclic increases and decreases in temperature which would normally cause operation of prior control systems cancel out and the corrective signal obtained represents the actual or true fuel demand of the furnace for the next period of operation.

It is obvious that the control circuit could be arranged to be actuated on a time basis to effect a corrective change in fuel supply at times other than during alternate furnace reversals or arranged to effect a corrective change during each reversal. It has been found, however, that for the particular glass tank application of the invention disclosed, an integration over a complete furnace cycle is most accurate since during the cycle the furnace is fired for equal periods of time from both sides, and thus any differences in firing conditions between the opposite sides is compensated for.

While only one embodiment of the invention has been herein shown and described, it will be apparent to those skilled in the art that many changes may be made in the construction and arrangement of parts without departing from the scope of the invention as defined in the appended claims.

What we claim as new and desire to secure by Letters Patent of the United States is:

1. An apparatus for indicating and/or controlling a variable comprising a bridge circuit having one variable resistance element for effecting unbalance thereof and a second variable resistance element for effecting rebalance of said bridge circuit, a measuring circuit responsive to the deviations of the variable including a first reversible electric motor continuously rotatable in opposite directions depending upon the direction of the deviation of the variable from a set point, the net rotation of said motor corresponding to the integral of the deviations, means for connecting said motor to said one variable resistance to effect a state of unbalance of said bridge circuit proportional to the integral of said deviations, a second reversible electric motor connected to the output of said bridge circuit rotatable in response to unbalance of said bridge circuit and operatively connected to said second variable resistance to effect rebalance of said bridge circuit, means for normally preventing rotation of said second electric motor, and a control circuit for actuating said last named means at the end of predetermined periods of integration to permit rotation of said second motor to rebalance the bridge circuit, the change in position of said motor being indicative of the integral of the deviations and means actuated by said second motor for varying the magnitude of the variable.

2. An apparatus for indicating and/or controlling a variable as claimed in claim 1 wherein said measuring circuit includes a bridge circuit operative to become unbalanced upon a deviation of the variable from said set point.

3. An apparatus for indicating and/or controlling a variable as claimed in claim 2 wherein modulating means is provided for modulating the output of said measuring bridge circuit and an electronic relay responsive to the phase and magnitude of the modulated signal is provided for controlling the extent and direction of rotation of said first electric motor.

4. An apparatus for indicating and/or controlling a variable as claimed in claim 1 wherein a pilot valve is actuated by said second motor for establishing a pneumatic signal representative of the integral of the deviations.

5. An apparatus for indicating and/or controlling a variable as claimed in claim 1 wherein said means for preventing rotation of said second motor comprises a control winding for said second motor coupled to the output of said bridge circuit, a switch biased to a closed position connected in a conductor across said winding for limiting the current in said winding to a value insufficient to effect rotation of said second motor.

6. The apparatus as claimed in claim 5 wherein said control circuit includes a relay coil for periodically actuating said switch to an open position to permit rotation of said second motor by the output of said bridge circuit.

7. An apparatus for controlling a regenerative furnace having a pair of reversing dampers for transferring the firing of the furnace between opposite sides thereof and a reversing mechanism for periodically actuating the dampers to accomplish the reversal, comprising a bridge circuit having one variable resistance element for effecting unbalance of said bridge circuit and a second variable resistance element for effecting rebalance of said bridge circuit, a measuring circuit responsive to the deviations of the temperature within the furnace including a first reversible electric motor continuously rotatable in opposite directions depending upon the direction of the deviations of the variable from a set point, the net rotation of said motor corresponding to the integral of the deviations, means for connecting said motor to said one variable resistance to effect a state of unbalance of said bridge circuit proportional to the integral of the temperature deviations, a second reversible electric motor connected to the output of said bridge circuit rotatable in response to unbalance of said bridge circuit and operatively connected to said second variable resistance to effect rebalance of said bridge circuit, a control winding for said second motor, a switch connected in a circuit with said control winding for controlling energization of said second electric motor by said output of said bridge circuit, said switch being biased to a position for preventing rotation of said second electric motor, a relay coil operatively associated with said switch and operative upon energization thereof to actuate said switch to a position permitting rotation of said second electric motor, and a control circuit including switch means actuated by the reversing dampers for controlling energization of said relay coil.

8. The apparatus as claimed in claim 7 wherein said control circuit includes circuitry for limiting energization of said relay coil by said switch means to alternate furnace reversals.

9. The apparatus as claimed in claim 8 wherein circuit means including a timing device is provided for insuring energization of said relay coil for at least ten seconds following energization thereof by said control circuit.

10. The apparatus as claimed in claim 9 wherein means including a manually operable switch and relay coil are provided for energizing the first said relay coil manually for the ten second period.

11. The apparatus as claimed in claim 10 wherein clutch means are provided for disconnecting the first said electric motor from said one variable resistance, and circuit means are provided for actuating said clutch means to disconnect the motor upon actuation of said manually operable switch whereby said one variable resistance may be positioned manually.

12. An apparatus for controlling the temperature of a regenerative furnace having provision for firing from opposite sides thereof and a source of fluid fuel, the combination comprising means for continuously measuring the temperature within the furnace and for establishing a signal representative of the deviation of the temperature from a set point, means for continuously integrating deviations of said signal to produce a signal representative of the integrated deviations, means for periodically reversing the firing of the furnace between opposite sides thereof, and means associated with said integrating means for adjusting the fuel supply to the furance only during alternate reversals to establish a rate of fuel supply to the furnace proportional to the integral of the deviations over the preceding period of furnace operation since a previous correction.

13. An apparatus for controlling the operation of a furnace having a control valve for regulating the fuel supply thereto, an inlet air damper and a stack damper, comprising means for measuring the flow rate of fuel supplied to the furnace to produce a signal representative of the flow rate, means responsive to said signal for actuating said control valve, said inlet damper and said stack damper to maintain a predetermined air and fuel flow to the furnace and a predetermined furnace pressure, means for measuring the temperature within the furnace and integrating deviations of the temperature from a set point temperature, and means operative in accordance with a predetermined time schedule for periodically modifying the signal representative of flow rate in accordance with the integral of the temperature deviations over predetermined time periods of furnace operation.

14. An apparatus for controlling a furnace as claimed in claim 13, further including means for measuring the pressure within the furnace to produce a signal representative of the pressure, means for measuring the oxygen content of the flue gas from the furnace to produce a signal representative of the oxygen content, means cooperative with said signal responsive means for modifying actuation of said inlet damper and outlet damper in accordance with the signal representative of oxygen content, and means cooperative with said signal responsive means and said last named means for further modifying actuation of said stack damper in accordance with the signal representative of furnace pressure.

15. The method of controlling the temperature of a furnace which includes the steps of, measuring the temperature within the furnace, establishing an electrical signal having a phase and magnitude representative of the direction and magnitude of the temperature deviations, modulating said electrical signal, applying the modulated signal to control the direction of rotation of an electric motor to produce a net rotation of the motor proportional to the integral of the temperature deviations, varying the impedance of one arm of a bridge circuit by rotation of said motor to produce a condition of bridge unbalance corresponding to the net motor rotation, varying the impedance of another arm of the bridge circuit only at the end of predetermined periods of furnace operation in accordance with a predetermined time schedule to effect balance of the bridge circuit, and varying the supply of fuel to the furnace in proportion to the change in impedance of the second bridge arm necessary to effect balance of the bridge circuit.

16. In a control system for controlling the temperatures of a process having a high heat storage capacity, the combination comprising, means for establishing a signal representative of the magnitude of the temperature, means for correcting the rate of heat energy input to the process only at predetermined time intervals in accordance with a predetermined time schedule to thereby establish successive periods of process operation at fixed rates of energy input, means for continuously integrating deviations of said signal from a predetermined reference point to produce a signal representative of the integrated deviations, and means responsive to said integrated deviation signal for actuating said correcting means during each instance of correction to effect a change in the heat energy input to the process only at the end of each of said periods proportional to the integral of the deviations since a previous correction to thereby establish a rate of energy input for the next period.

17. A method of controlling the temperature of a furnace which includes the steps of, measuring the temperature within the furnace, establishing a signal representative of the deviations of the temperature from a predetermined set point, continuously integrating said signal, automatically correcting the flow of fuel to the furnace only at the end of predermined periods of furnace operation in accordance with a predetermined time schedule to establish successive periods of furnace operation at fixed rates of fuel supply, and automatically setting a rate of fuel supply during each correction proportional to the integral of said deviations since a previous correction.

18. The method of firing and controlling the temperature of a furnace adapted to be fired from opposite sides thereof which includes the steps of, continuously measuring the temperature within the furnace, establishing a signal representative of the deviations of the temperature from a predetermined set point, alternately reversing the firing of the furnace from one side thereof to the other in accordance with a predetermined time schedule, and automatically adjusting the flow of fuel to the furnace only during each alternate reversal in accordance with the integral of said deviations during the period of firing of said furnace on both sides thereof since a previous correction.

19. The method of controlling the firing and temperature of a furnace which includes the steps of, firing the furnace from one side thereof for a predetermined period of time, measuring the temperature within the furnace continuously during the predetermined period of time, continuously establishing a signal representative of the deviations of the temperature from a predetermined set point, integrating the deviations of the signal from the set point for the predetermined period of time, automatically reversing the firing of the furnace to the other side thereof at the end of the predetermined time, and simultaneously and automatically adjusting the flow of fuel to the furnace in accordance with the integral of the deviations of the signal during the predetermined time.

20. In a control system for controlling the supply of fuel to a process, the combination comprising, a first bridge circuit including an adjustable resistance connected as one arm thereof, means for adjusting said resistance to vary the degree of balance of said first bridge circuit in accordance with the magnitude of the process temperature, means for modulating the output of said first bridge circuit to produce an alternating signal the positive and negative duration of which is determined by the deviation of the variable, an electronic relay receiving the output of said modulating means, a first electric motor controlled by said relay and rotatable in one direction when the output signal of said modulating means is positive and in an opposite direction when the output signal is negative to establish a net rotation of said motor corresponding to the integral of the deviations over a period of time, a second bridge circuit including an adjustable resistance operatively connected to said first motor for varying the degree of balance of said second bridge circuit in accordance with the position of said first motor, a second electric motor connected to the output of said second bridge circuit to be rotated in response to unbalance of said second bridge circuit, an adjustable rebalancing resistance associated with said second bridge circuit and connected to said second electric motor to be actuated thereby to effect rebalance of said second bridge circuit, a pilot valve operatively connected to said second electric motor to be positioned thereby for establishing a pneumatic signal, means responsive to said pneumatic signal for varying the rate of fuel supply to the process, switch means connected to said second electric motor for normally preventing rotation thereof, and means operative only at the end of predetermined time intervals in accordance with a predetermined time schedule for actuating said switch means to effect rotation of said second electric motor in accordance with unbalance of said second bridge circuit to effect correction of the rate of fuel supply only at the end of said predetermined time intervals in accordance with the integral of the deviations since a previous correction.

References Cited in the file of this patent

UNITED STATES PATENTS

| | | |
|---|---|---|
| 1,956,577 | Irwin | May 1, 1934 |
| 2,213,956 | Drake | Sept. 10, 1940 |
| 2,359,885 | Vollrath | Oct. 10, 1944 |
| 2,390,902 | Vollrath | Dec. 11, 1945 |
| 2,593,562 | Hornfeck | Apr. 22, 1952 |
| 2,604,527 | Buehler | July 22, 1952 |

OTHER REFERENCES

Hubbell: Article in Iron and Steel Engineer, August 1953 pages 53–56.